(12) United States Patent
Nishimura et al.

(10) Patent No.: US 10,175,475 B2
(45) Date of Patent: Jan. 8, 2019

(54) ROTARY DRIVE APPARATUS (71) Applicant: Nidec Corporation, Kyoto (JP)

(72) Inventors: Hideki Nishimura, Kyoto (JP); Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 149 days.

(21) Appl. No.: 15/479,517

(22) Filed: Apr. 5, 2017

(65) Prior Publication Data

US 2017/0315345 A1 Nov. 2, 2017

Related U.S. Application Data (60) Provisional application No. 62/328,844, filed on Apr. 28, 2016.

(51) Int. Cl.
| G02B 26/10 | (2006.01) |
| H02K 7/08 | (2006.01) |
| H02K 1/27 | (2006.01) |
| H02K 7/14 | (2006.01) |
| G02B 7/182 | (2006.01) |

(52) U.S. Cl.
CPC ......... *G02B 26/105* (2013.01); *G02B 7/1821* (2013.01); *H02K 1/2706* (2013.01); *H02K 1/2786* (2013.01); *H02K 7/08* (2013.01); *H02K 7/083* (2013.01); *H02K 7/14* (2013.01)

(58) Field of Classification Search
CPC ................ G02B 26/105; G02B 7/1821; G02B 26/0816; G02B 21/0048; H02K 1/2706; H02K 1/2786; H02K 7/08; H02K 7/083; H02K 7/14

USPC ........... 359/200.2–200.5, 212.2, 220.1, 855; 310/90, 90.5

See application file for complete search history.

(56) References Cited

U.S. PATENT DOCUMENTS

| 5,596,443 A | * | 1/1997 | Konno | G02B 26/121 |
| | | | | 359/198.1 |
| 5,734,515 A | * | 3/1998 | Shaffer | G02B 23/08 |
| | | | | 359/220.1 |
| 6,654,063 B1 | * | 11/2003 | Tadatsu | G02B 13/06 |
| | | | | 348/36 |
| 2007/0169348 A1 | * | 7/2007 | Ueda | F16C 17/10 |
| | | | | 29/898.07 |

(Continued)

FOREIGN PATENT DOCUMENTS

JP 06-027401 A 2/1994

*Primary Examiner* — Frank G Font
(74) *Attorney, Agent, or Firm* — Keating & Bennett, LLP (57) ABSTRACT

This rotary drive apparatus is an apparatus arranged to rotate a first mirror and a second mirror each of which reflects incident light coming from a light source. The rotary drive apparatus includes rotating bodies including a first rotating body including the first mirror, and a second rotating body including the second mirror; and a motor arranged to support the rotating bodies. The motor includes a stationary portion including a stator; and a rotating portion supported through a bearing portion to be rotatable about a central axis extending in a vertical direction with respect to the stationary portion, the rotating portion including a magnet arranged opposite to the stator. At least a portion of the first mirror is arranged on the central axis above the bearing portion. At least a portion of the second mirror is arranged on the central axis below the bearing portion.

15 Claims, 5 Drawing Sheets (56) References Cited

U.S. PATENT DOCUMENTS

2009/0002678 A1* 1/2009 Tanaka .................. G01S 7/4813
356/4.01
2014/0226204 A1* 8/2014 Mitzkus ................. G02B 21/06
359/388

* cited by examiner

ROTARY DRIVE APPARATUS

CROSS REFERENCE TO RELATED APPLICATIONS

This application claims the benefit of priority to U.S. Patent Application No. 62/328,844 filed on Apr. 28, 2016. The entire contents of this application are hereby incorporated herein by reference.

BACKGROUND OF THE INVENTION

1. Field of the Invention

The present invention relates to a rotary drive apparatus.

2. Description of the Related Art

Scanner apparatuses for position recognition using a head-mounted display (HMD) have been used. Such a scanner apparatus is set in a room, for example, to detect position information as to a target object and recognize the position thereof in a space. Two rotating bodies each of which is arranged to cause a mirror to reflect light emitted from a light source and emit a resulting reflected light to a surrounding space to irradiate the target object therewith, and two motors arranged to rotatably support the two respective rotating bodies are installed in the scanner apparatus.

Such an apparatus that causes light to be reflected and causes resulting reflected lights to travel in two directions is described in, for example, JP-A 1994-027401. In an optical-scanning image information detection apparatus described in JP-A 1994-027401, light beams emitted from two light sources are guided by an optical member, such as a prism, to a reflective surface of a mirror to cause the mirror to reflect the light beams (see FIG. 2 of this publication).

However, the optical-scanning image information detection apparatus described in JP-A 1994-027401 requires the light sources to be arranged at two locations. It is therefore difficult to apply this technique to an apparatus that should be installed in a limited space.

SUMMARY OF THE INVENTION

According to a preferred embodiment of the present invention, there is provided a rotary drive apparatus arranged to rotate a first mirror and a second mirror each of which reflects incident light coming from a light source, the rotary drive apparatus including rotating bodies including a first rotating body including the first mirror, and a second rotating body including the second mirror; and a motor arranged to support the rotating bodies. The motor includes a stationary portion including a stator; and a rotating portion supported through a bearing portion to be rotatable about a central axis extending in a vertical direction with respect to the stationary portion, the rotating portion including a magnet arranged opposite to the stator. The stationary portion includes a base portion arranged to support the stator. The rotating portion includes a shaft arranged to extend along the central axis, and including a through hole passing therethrough in the vertical direction; and a rotor hub portion having the magnet directly or indirectly fixed thereto, and arranged to extend in an annular shape around the shaft. At least a portion of the first mirror is arranged on the central axis above the bearing portion. At least a portion of the second mirror is arranged on the central axis below the bearing portion.

According to the above preferred embodiment of the present invention, the two rotating bodies, each of which includes a mirror, may be fixed to upper and lower portions of the rotating portion of the motor, and be supported to be rotatable with respect to the stationary portion. In addition, the incident light coming from the light source passes through the through hole passing through the shaft of the motor in the vertical direction, and this allows light traveling in one direction to be reflected by mirrors arranged above and below the motor to emit resulting reflected lights to a surrounding space. Thus, a reduction in the size of the apparatus can be achieved. Moreover, the apparatus can be installed in a limited space.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a light source is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

1. First Preferred Embodiment 1-1. Structure of Rotary Drive Apparatus

Figure 1:
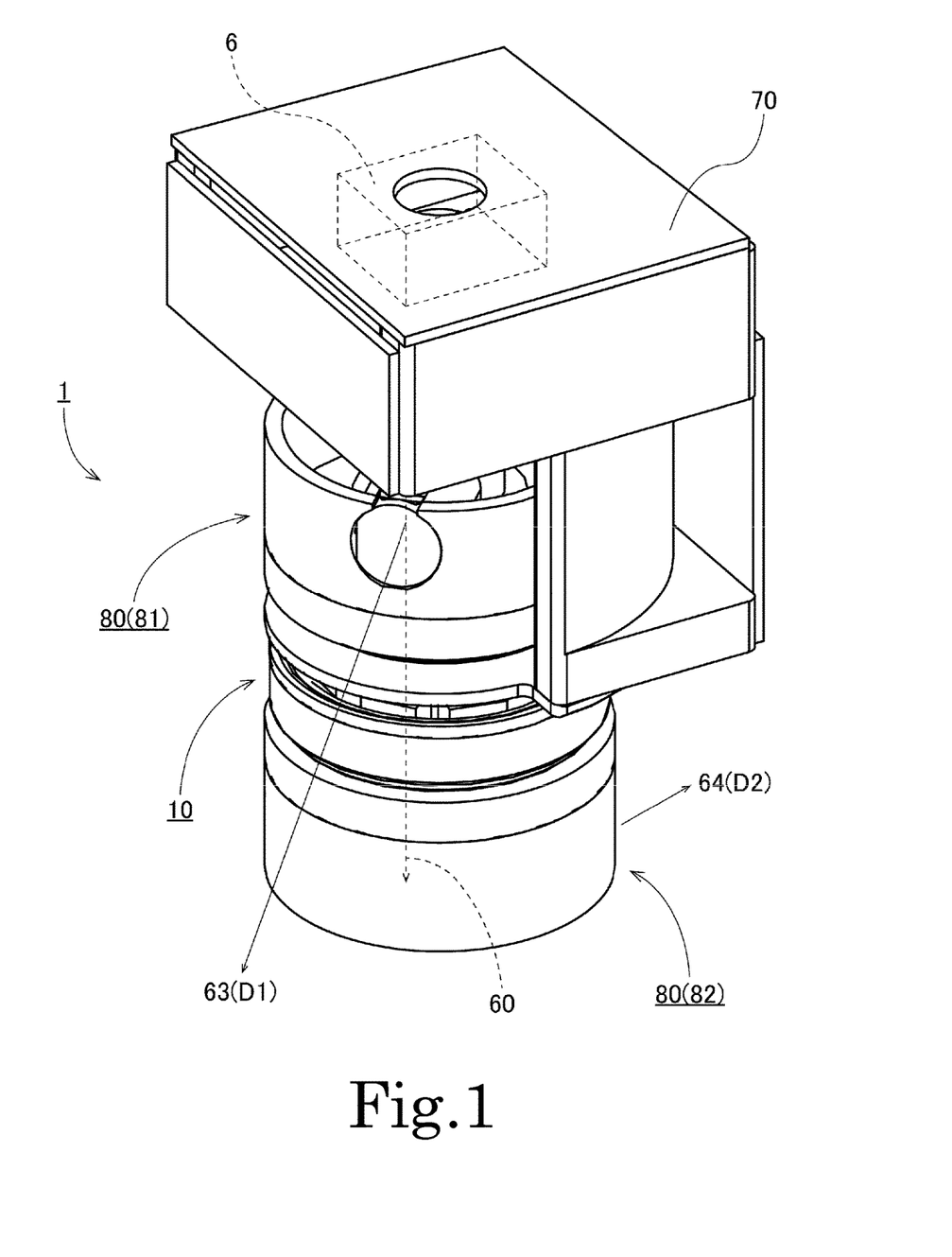
FIG. 1 is a perspective view of a rotary drive apparatus and a light source according to a first preferred embodiment of the present invention.
Figure 2:
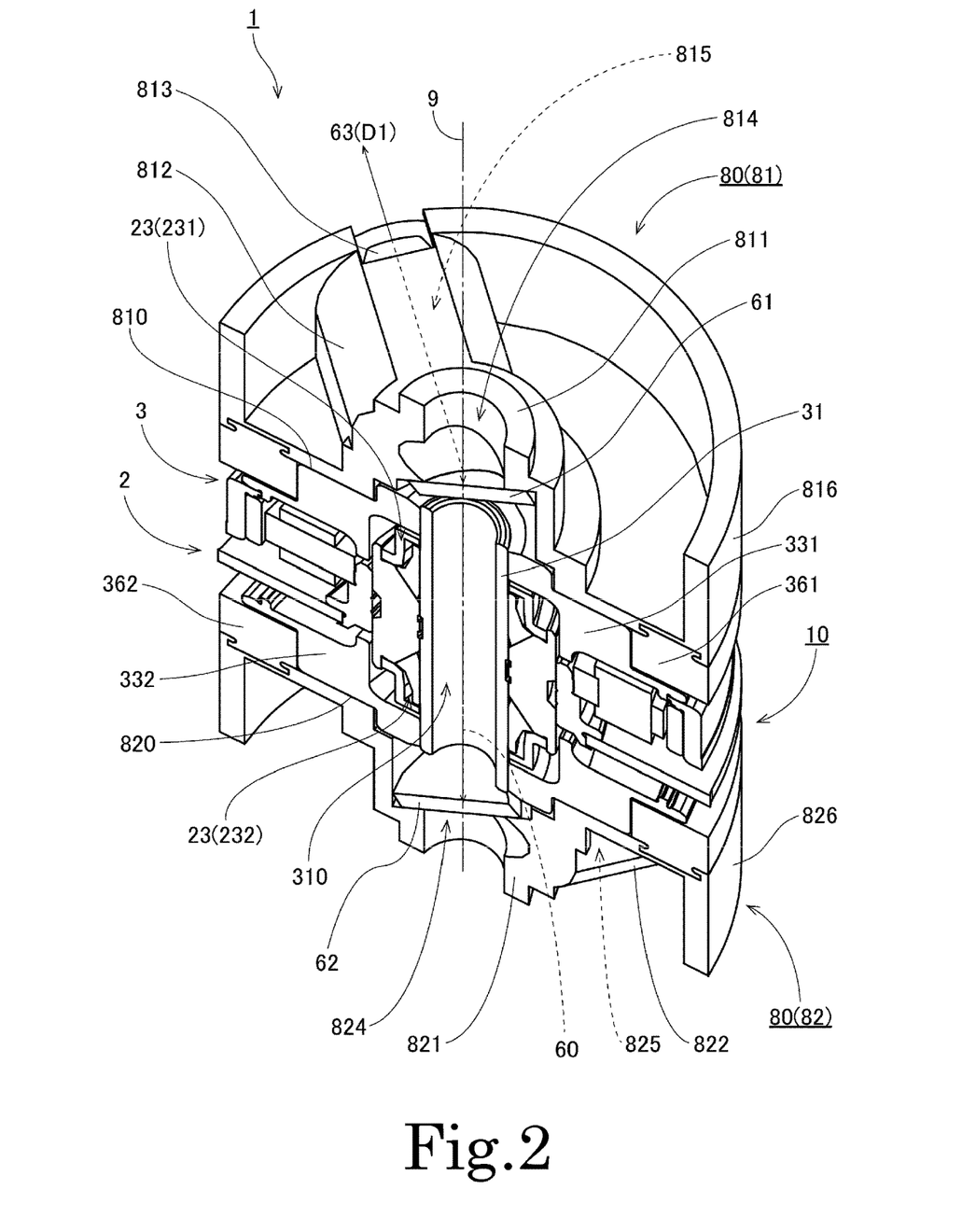
FIG. 2 is a perspective sectional view of the rotary drive apparatus according to the first preferred embodiment of the present invention.

FIG. 1 is a perspective view of a light source 6 and a rotary drive apparatus 1 according to a first preferred embodiment of the present invention. FIG. 2 is a perspective sectional view of the rotary drive apparatus 1 taken along a plane including a central axis 9. The rotary drive apparatus 1 is an apparatus that receives incident light 60 from the light source 6, and emits reflected lights obtained by mirrors (which will be described below) reflecting the incident light 60 to an outside of the rotary drive apparatus 1 through lenses while rotating the mirrors. The light source 6 according to the present preferred embodiment is arranged outside of the rotary drive apparatus 1. Note, however, that the light source 6 may alternatively be included in the rotary drive apparatus 1.

Referring to FIGS. 1 and 2, the rotary drive apparatus 1 includes rotating bodies 80 and a motor 10 arranged to support the rotating bodies 80. The rotating bodies 80 include a first rotating body 81 and a second rotating body 82. The first rotating body 81 includes a first mirror 61 arranged to reflect a portion of the incident light 60. The second rotating body 82 includes a second mirror 62 arranged to reflect another portion of the incident light 60. The first and second rotating bodies 81 and 82 will be described in detail below.

1-2. Structure of Motor

Figure 3:
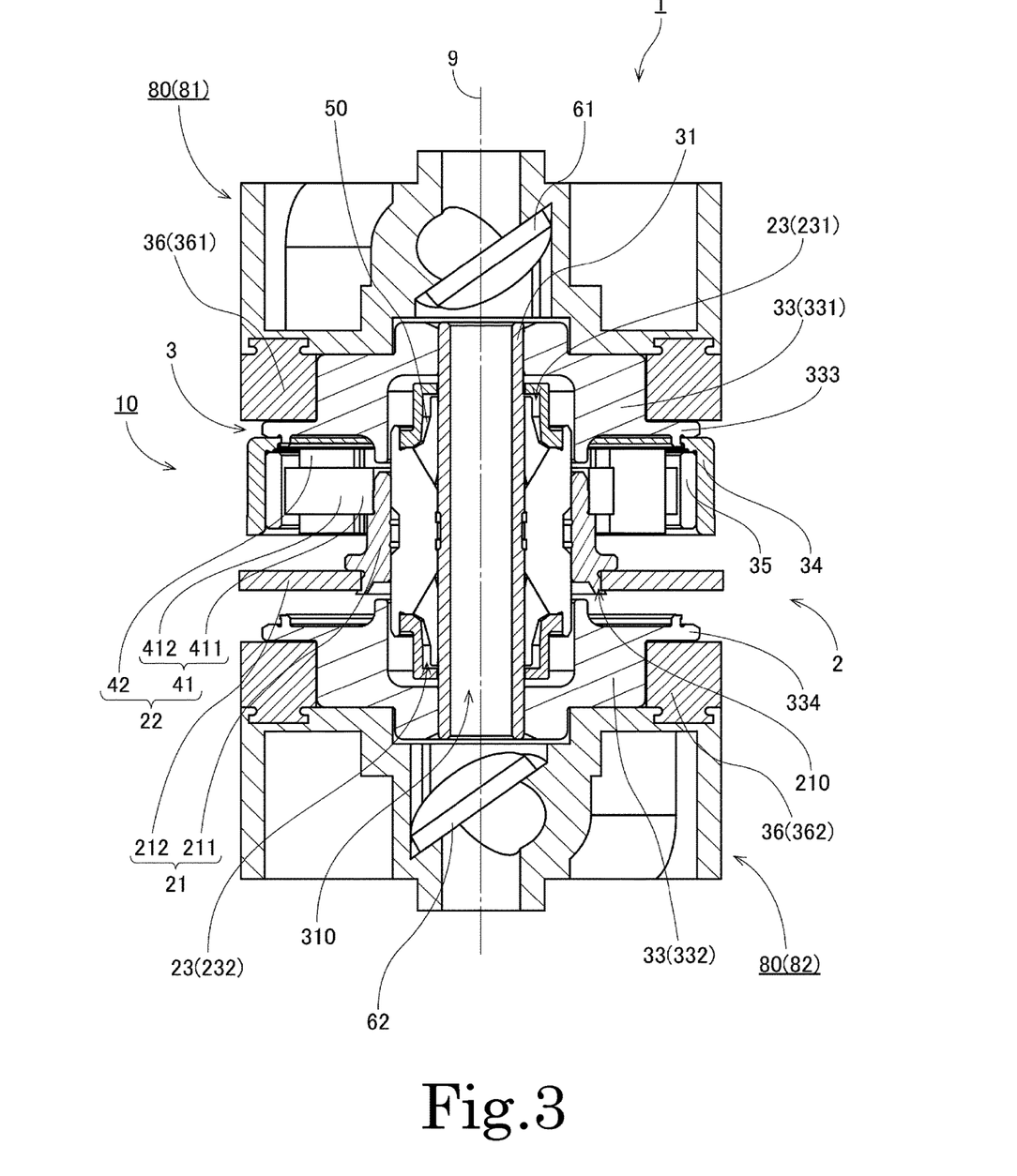
FIG. 3 is a vertical sectional view of the rotary drive apparatus according to the first preferred embodiment of the present invention.
Figure 4:
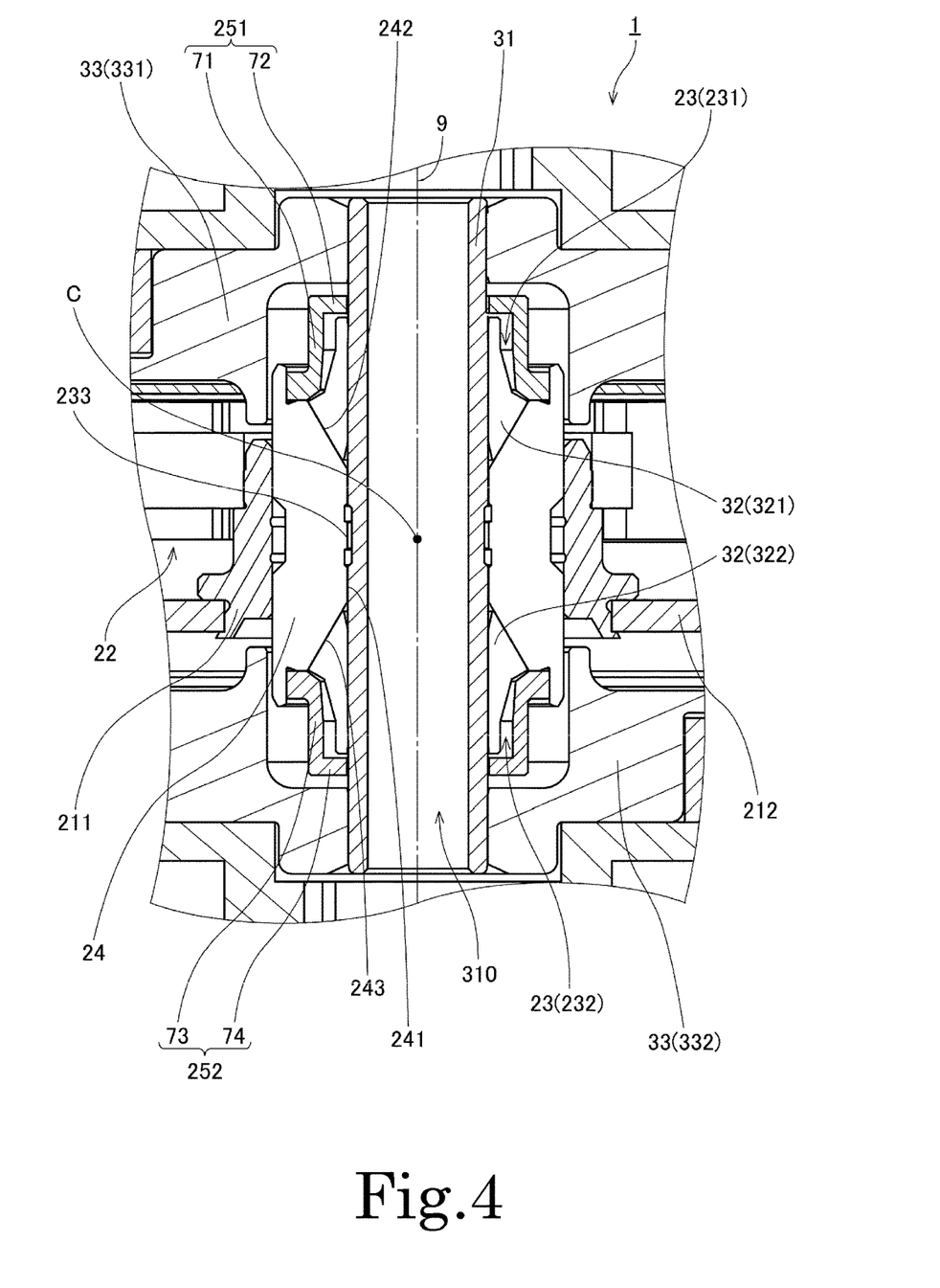
FIG. 4 is a partial vertical sectional view of the rotary drive apparatus according to the first preferred embodiment of the present invention.

Next, the structure of the aforementioned motor 10 will be described in more detail below. FIG. 3 is a vertical sectional view of the rotary drive apparatus 1. FIG. 4 is a partial vertical sectional view of the rotary drive apparatus 1. Referring to FIG. 3, the motor 10 includes a stationary portion 2 and a rotating portion 3. The stationary portion 2 is arranged to be stationary relative to a case or the like (not shown) in which the rotary drive apparatus 1 is arranged. The rotating portion 3 is supported through a bearing portion 23, which will be described below, to be rotatable about the central axis 9, which extends in the vertical direction, with respect to the stationary portion 2.

The stationary portion 2 according to the present preferred embodiment includes a base portion 21, a stator 22, and the bearing portion 23, which is arranged to rotatably support a shaft 31 of the rotating portion 3, which will be described below.

The base portion 21 is arranged to extend perpendicularly to the central axis 9 between the first and second rotating bodies 81 and 82. The base portion 21 includes a stator holder 211 and a base body 212.

The base body 212 is a plate-shaped member arranged to support the stator holder 211. A metal, such as, for example, an aluminum alloy or stainless steel, is used as a material of the base body 212. The base body 212 is arranged to extend radially outward from an outer circumference of the stator holder 211. When the motor 10 is used, the base body 212 is, for example, fixed to the case or the like in which the rotary drive apparatus 1 is arranged through screws or the like. Note that a circuit board (not shown) may be arranged on an upper surface or a lower surface of the base body 212 to supply electric drive currents to the motor 10.

The stator holder 211 is a cylindrical member arranged to extend in the axial direction. A lower end portion of the stator holder 211 is inserted in a through hole 210 of the base body 212, and is fixed to the base body 212 by crimping. Note, however, that the stator holder 211 may alternatively be fixed to the base body 212 by another method, such as, for example, welding. Also note that the base body 212 and the stator holder 211 may alternatively be defined by a single continuous monolithic member.

The stator 22 is an armature including a stator core 41 and a plurality of coils 42. The stator 22 is arranged above at least a portion of the base portion 21. The stator core 41 is defined by, for example, laminated steel sheets, that is, electromagnetic steel sheets, such as silicon steel sheets, placed one upon another in the axial direction. The stator core is supported by being fixed to an outer circumferential surface of the stator holder 211 through, for example, an adhesive. In addition, the stator core 41 includes a core back 411 in the shape of a circular ring and a plurality of teeth 412 arranged to project radially outward from the core back 411. The coils 42 are a collection of conducting wires wound around the teeth 412. The electric drive currents for the motor 10 are supplied from an external power supply (not shown) to the coils 42 through the aforementioned circuit board and the conducting wires. The teeth 412 and the coils 42 are preferably arranged in the shape of a circular ring and at substantially regular intervals in a circumferential direction about the central axis 9.

As illustrated in FIG. 4, the bearing portion 23 includes a sleeve 24, a first cap 251, and a second cap 252.

The sleeve 24 is arranged to extend in the axial direction to substantially assume a cylindrical shape around the shaft 31. The sleeve 24 is inserted in a space radially inside of the stator holder 211, and is fixed to the stator holder 211 through, for example, an adhesive. An upper end portion of the sleeve 24 is arranged axially above an upper end portion of the stator holder 211 and an upper end portion of the stator 22. In addition, a lower end portion of the sleeve 24 is arranged axially below a lower end portion of the stator holder 211 and a lower end portion of the stator 22. Note that the sleeve 24 may be defined by a plurality of members.

The first cap 251 includes a first tubular portion 71 and a first plate portion 72. The first tubular portion 71 is fixed to the sleeve 24 in the vicinity of the upper end portion of the sleeve 24, and is arranged to extend upward to substantially assume a cylindrical shape. The first plate portion 72 is arranged to extend radially inward from an upper end portion of the first tubular portion 71.

The second cap 252 includes a second tubular portion 73 and a second plate portion 74. The second tubular portion 73 is fixed to the sleeve 24 in the vicinity of the lower end portion of the sleeve 24, and is arranged to extend downward to substantially assume a cylindrical shape. The second plate portion 74 is arranged to extend radially inward from a lower end portion of the second tubular portion 73.

The structure of the bearing portion 23 will be described in detail below.

The rotating portion 3 according to the present preferred embodiment includes the shaft 31, annular portions 32, rotor hub portions 33, a yoke 34, a magnet 35, and inertia portions 36.

The shaft 31 is a columnar member arranged to extend in the axial direction along the central axis 9 radially inside of the sleeve 24. A metal, such as, for example, a ferromagnetic or nonmagnetic stainless steel, is used as a material of the shaft 31. An upper end portion of the shaft 31 is arranged to project upward above the upper end portion of the sleeve 24 and an upper end portion of the first cap 251. In addition, a lower end portion of the shaft 31 is arranged to project downward below the lower end portion of the sleeve 24 and a lower end portion of the second cap 252. An outer circumferential surface of the shaft 31 and an inner circumferential surface 241 of the sleeve 24 are arranged radially opposite to each other with a slight gap therebetween. In addition, the shaft 31 includes a shaft through hole 310 arranged to pass through the shaft 31 in the vertical direction. Note that the shaft 31 and at least one of the rotor hub portions 33, which will be described below, may alternatively be defined by a single monolithic member.

The annular portions 32 include a first annular portion 321 and a second annular portion 322. The first annular portion 321 is a member at least a portion of which is fixed to the outer circumferential surface of the shaft 31 and is arranged to project radially outward all the way around the shaft 31 above the base body 212. Meanwhile, the second annular portion 322 is a member at least a portion of which is fixed to the outer circumferential surface of the shaft 31 and is arranged to project radially outward all the way around the shaft 31 below the base body 212. Note that the shaft 31 and at least one of the annular portions 32 may alternatively be defined by a single monolithic member.

An outer circumferential surface of a lower portion of the first annular portion 321 and an upper inclined surface 242 of the sleeve 24, which is included in an upper portion of the sleeve 24 and is inclined with respect to the axial direction, are arranged obliquely opposite to each other with a slight gap therebetween. Meanwhile, an outer circumferential surface of an upper portion of the second annular portion 322 and a lower inclined surface 243 of the sleeve 24, which is included in a lower portion of the sleeve 24 and is inclined with respect to the axial direction, are arranged obliquely opposite to each other with a slight gap therebetween.

Further, an outer circumferential surface of an upper portion of the first annular portion 321 and an inner circumferential surface of the first tubular portion 71 of the first cap 251 are arranged radially opposite to each other with a slight gap therebetween. In addition, an outer circumferential surface of a lower portion of the second annular portion 322 and an inner circumferential surface of the second tubular portion 73 of the second cap 252 are arranged radially opposite to each other with a slight gap therebetween.

The rotor hub portions 33 include a first rotor hub portion 331 and a second rotor hub portion 332. The first rotor hub portion 331 is arranged to extend radially outward from a peripheral portion of the upper end portion of the shaft 31 to assume an annular shape around the shaft 31. The second rotor hub portion 332 is arranged to extend radially outward from a peripheral portion of the lower end portion of the shaft 31 to assume an annular shape around the shaft 31. An aluminum alloy or a ferromagnetic or nonmagnetic stainless steel, for example, is used as a material of the rotor hub portions 33. The upper end portion of the shaft 31 is fixed by being press fitted in a through hole defined radially inside of the first rotor hub portion 331 and passing through the first rotor hub portion 331 in the axial direction. Meanwhile, the lower end portion of the shaft 31 is fixed by being press fitted in a through hole defined radially inside of the second rotor hub portion 332 and passing through the second rotor hub portion 332 in the axial direction.

The yoke 34 is a cylindrical member fixed to a radial outside of the magnet 35, which will be described below, to hold the magnet 35. An outer circumferential surface of the magnet 35 is fixed to an inner circumferential surface of the yoke 34. The yoke 34 is arranged to be substantially coaxial with the central axis 9. An upper end portion of the yoke 34 is fixed to a lower portion of the first rotor hub portion 331 through an adhesive or by crimping, for example. A magnetic material having a relatively large mass, such as, for example, iron, is used as a material of the yoke 34. This leads to an increased inertial force of the rotating portion 3. This in turn leads to more stabilized posture of the rotating portion 3 while the motor 10 is running.

The magnet 35 is fixed to the inner circumferential surface of the yoke 34 through, for example, an adhesive. A permanent magnet in the shape of a circular ring is used as the magnet 35 according to the present preferred embodiment. The magnet 35 is substantially cylindrical, and is arranged radially outside of the stator 22. An inner circumferential surface of the magnet 35 includes north and south poles arranged to alternate with each other in the circumferential direction. In addition, the inner circumferential surface of the magnet 35 is arranged radially opposite to a radially outer end surface of each of the teeth 412 with a slight gap therebetween. Note that a plurality of magnets may be used in place of the magnet 35 in the shape of a circular ring. In the case where the plurality of magnets are used, the magnets are arranged on the inner circumferential surface of the yoke 34 such that pole surfaces of the north poles and pole surfaces of the south poles alternate with each other in the circumferential direction. The magnet 35 according to the present preferred embodiment is indirectly fixed to the first rotor hub portion 331 through the yoke 34 as described above. Note, however, that the magnet 35 may alternatively be directly fixed to the first rotor hub portion 331 without the yoke 34 intervening therebetween.

The inertia portions 36 include a first inertia portion 361 and a second inertia portion 362. The first inertia portion 361 is an annular member arranged axially below the first rotating body 81, which will be described below. The second inertia portion 362 is an annular member arranged axially above the second rotating body 82, which will be described below. The first inertia portion 361 is fixed to an outer circumferential surface of the first rotor hub portion 331 through, for example, an adhesive. The second inertia portion 362 is fixed to an outer circumferential surface of the second rotor hub portion 332 through, for example, an adhesive. Accordingly, the first and second inertia portions 361 and 362 rotate together with the rotating bodies 80 and the rotating portion 3 including the rotor hub portions 33 while the motor 10 is running.

A metal, such as, for example, stainless steel, is used as a material of the inertia portions 36. The inertia portions 36 are arranged to have a specific gravity greater than a specific gravity of the rotating bodies 80. Accordingly, provision of the inertia portions 36 increases the inertial force of the rotating portion 3 while the motor 10 is running. This contributes to stabilizing the posture of the rotating portion 3.

In this motor 10, a lower surface of the first inertia portion 361 is arranged to be in contact with an upper surface of a first flange portion 333 arranged to extend radially in the lower portion of the first rotor hub portion 331. This stabilizes the axial position of the first inertia portion 361. Further, in this motor 10, the first inertia portion 361 is arranged above the first flange portion 333 and below the first rotating body 81. That is, the first inertia portion 361 is held between the first rotor hub portion 331 and the first rotating body 81. This further stabilizes the axial position of the first inertia portion 361.

In addition, an upper surface of the second inertia portion 362 is arranged to be in contact with a lower surface of a second flange portion 334 arranged to extend radially in an upper portion of the second rotor hub portion 332. This stabilizes the axial position of the second inertia portion 362. Moreover, in this motor 10, the second inertia portion 362 is arranged below the second flange portion 334 and above the second rotating body 82. That is, the second inertia portion 362 is held between the second rotor hub portion 332 and the second rotating body 82. This further stabilizes the axial position of the second inertia portion 362. The stabilized axial position of both the upper and lower inertia portions 36 contributes to preventing a tilt of the inertia portions 36. Accordingly, the posture of the rotating portion 3 is further stabilized while the motor 10 is running.

Once, in the motor 10 described above, the electric drive currents are supplied to the coils 42 through the aforementioned circuit board, magnetic flux is generated around each of the teeth 412. Then, interaction between the magnetic flux of the teeth 412 and magnetic flux of the magnet 35 produces a circumferential torque between the stationary portion 2 and the rotating portion 3, so that the rotating portion 3 is caused to rotate about the central axis 9 with respect to the stationary portion 2. The inertia portions 36, which are fixed to the rotor hub portions 33, and the rotating bodies 80, which are supported by the rotating portion 3 and will be described below, rotate about the central axis 9 together with the rotating portion 3.

1-3. Structure of Bearing Portion

Next, the structure of the bearing portion 23 will be described in detail below.

As described above, the stationary portion 2, which includes the sleeve 24, the first cap 251, and the second cap 252, and the rotating portion 3, which includes the shaft 31, the first annular portion 321, and the second annular portion 322, are arranged opposite to each other with a gap therebetween. In addition, a lubricating oil 50 is arranged in this gap. A fluid dynamic pressure is induced in the lubricating oil 50 by a dynamic pressure groove defined in the inner circumferential surface of the sleeve 24 while the motor 10 is running. The rotating portion 3 is thus supported by the stationary portion 2, so that the rotating portion 3 can stably rotate. That is, in the present preferred embodiment, a bearing mechanism is defined by a combination of the sleeve 24, the first cap 251, and the second cap 252, which are components of the stationary portion 2, a combination of the shaft 31, the first annular portion 321, and the second annular portion 322, which are components of the rotating portion 3, and the lubricating oil 50 arranged therebetween.

A polyester oil or a diester oil, for example, is used as the lubricating oil 50. While the motor 10 is running, the rotating portion 3, which includes the shaft 31, the first annular portion 321, and the second annular portion 322, rotates about the central axis 9 while being supported through the lubricating oil 50 to be rotatable with respect to the stationary portion 2, which includes the sleeve 24, the first cap 251, and the second cap 252.

The lubricating oil 50 is arranged to exist continuously in the gap between the outer circumferential surface of the upper portion of the first annular portion 321 and the inner circumferential surface of the first tubular portion 71 of the first cap 251, the gap between the outer circumferential surface of the lower portion of the first annular portion 321 and the upper inclined surface 242, which is included in the upper portion of the sleeve 24 and is inclined with respect to the axial direction, and a gap between the outer circumferential surface of the shaft 31 and an upper portion of the inner circumferential surface 241 of the sleeve 24. Further, the lubricating oil 50 is arranged to exist continuously in a gap between the outer circumferential surface of the shaft 31 and a lower portion of the inner circumferential surface 241 of the sleeve 24, the gap between the outer circumferential surface of the upper portion of the second annular portion 322 and the lower inclined surface 243, which is included in the lower portion of the sleeve 24 and is inclined with respect to the axial direction, and the gap between the outer circumferential surface of the lower portion of the second annular portion 322 and the inner circumferential surface of the second tubular portion 73 of the second cap 252. However, the lubricating oil 50 does not exist in an axial middle portion of the gap between the outer circumferential surface of the shaft 31 and the inner circumferential surface 241 of the sleeve 24.

As described above, the bearing portion 23 has a so-called partially-filled structure, in which the lubricating oil exists at two or more separate locations (e.g., a location above the base body 212 of the motor 10 and a location below the base body 212) in the gap where the stationary portion 2 and the rotating portion 3 are opposed to each other. A first bearing portion 231 where a fluid dynamic pressure is induced in the lubricating oil 50 existing in a gap arranged above (i.e., arranged above the base body 212), and a second bearing portion 232 where a fluid dynamic pressure is induced in the lubricating oil 50 existing in a gap arranged below the first bearing portion 231 (i.e., arranged below the base body 212) are provided separately, and the base body 212 is arranged between the first and second bearing portions 231 and 232, whereby the rotary drive apparatus 1 is capable of stable rotation.

The stationary portion 2 is arranged to radially overlap with at least a portion of the first bearing portion 231. The stationary portion 2 is arranged to radially overlap with a center C of gravity of the rotating bodies 80, which will be described below. This leads to more stable rotation of the rotary drive apparatus 1. Note that the stationary portion 2 may not necessarily be arranged to radially overlap with at least a portion of the first bearing portion 231. Specifically, the stationary portion 2 may be arranged to radially overlap with at least a portion of the second bearing portion 232. In this case, the center C of gravity of the rotating bodies 80 may be located at a lower position to achieve more stable rotation of the rotary drive apparatus 1.

Note that the bearing portion 23 may alternatively be arranged to have a so-called full-fill structure, in which the lubricating oil 50 is arranged to exist continuously in the gap between the outer circumferential surface of the upper portion of the first annular portion 321 and the inner circumferential surface of the first tubular portion 71 of the first cap 251, the gap between the outer circumferential surface of the lower portion of the first annular portion 321 and the upper inclined surface 242, which is included in the upper portion of the sleeve 24 and is inclined with respect to the axial direction, the gap between the outer circumferential surface of the shaft 31 and the inner circumferential surface 241 of the sleeve 24, the gap between the outer circumferential surface of the upper portion of the second annular portion 322 and the lower inclined surface 243, which is included in the lower portion of the sleeve 24 and is inclined with respect to the axial direction, and the gap between the outer circumferential surface of the lower portion of the second annular portion 322 and the inner circumferential surface of the second tubular portion 73 of the second cap 252. This reduces the likelihood that a shock applied to the motor 10 during rotation thereof would cause a contact between the rotating portion 3 and the stationary portion 2.

An upper surface of the lubricating oil 50 is defined in the gap between the outer circumferential surface of the upper portion of the first annular portion 321 and the inner circumferential surface of the first tubular portion 71 of the first cap 251, and is arranged to radially overlap with the first rotor hub portion 331. In addition, a lower surface of the lubricating oil 50 is defined in the gap between the outer circumferential surface of the lower portion of the second annular portion 322 and the inner circumferential surface of the second tubular portion 73 of the second cap 252, and is arranged to radially overlap with the second rotor hub portion 332.

Further, in the case where the bearing portion 23 has the full-fill structure, within the first and second bearing portions 231 and 232, a radial bearing portion 233, where the outer circumferential surface of the shaft 31 and at least a portion of the stationary portion 2, including the inner circumferential surface 241 of the sleeve 24, are arranged radially opposite to each other with a gap (i.e., a radial gap) in which the lubricating oil 50 exists therebetween, is arranged to radially overlap with the center C of gravity of the rotating bodies 80, which will be described below. This leads to more stable rotation of the rotary drive apparatus 1.

1-4. Structure of Rotating Bodies

Next, the structure of the rotating bodies 80 will be described in detail below.

Reference is made again to FIGS. 1 and 2. A frame 70 containing the light source 6 is arranged above the rotary drive apparatus 1. The frame 70 is fixed to the case or the like in which the rotary drive apparatus 1 is arranged. The incident light 60, which travels downward along the central axis 9 of the motor 10, is emitted by the light source 6.

The rotating bodies 80 include the first and second rotating bodies 81 and 82. The first rotating body 81 is supported by an upper end portion of the rotating portion 3 of the motor 10, and is arranged to rotate about the central axis 9 together with the rotating portion 3. The second rotating body 82 is supported by a lower end portion of the rotating portion 3 of the motor 10, and is arranged to rotate about the central axis 9 together with the rotating portion 3. A resin, for example, is used as a material of each of the first and second rotating bodies 81 and 82, excluding the first and second mirrors 61 and 62, which will be described below.

As illustrated in FIG. 2, a lower surface 810 of the first rotating body 81 is fixed to upper surfaces of the first rotor hub portion 331 and the first inertia portion 361 through, for example, engagement, an adhesive, or the like. The first rotating body 81 includes a first vertical cylindrical portion 811, the first mirror 61, a first horizontal cylindrical portion 812, and a first lens 813.

The first vertical cylindrical portion 811 is a cylindrical portion arranged to be substantially coaxial with the central axis 9 of the motor 10, and extend in the axial direction. A lower end portion of the first vertical cylindrical portion 811 and an upper end portion of the shaft through hole 310 are arranged axially opposite to each other. That is, a cavity 814 radially inside of the first vertical cylindrical portion 811 is axially continuous with the shaft through hole 310. The cavity 814 radially inside of the first vertical cylindrical portion 811 and the shaft through hole 310 define an optical waveguide.

At least a portion of the first mirror 61 is arranged on the central axis 9 above the bearing portion 23. In the present preferred embodiment, the first mirror 61 is fixed to a resin member of the first rotating body 81 between the lower end portion of the first vertical cylindrical portion 811 and the upper end portion of the shaft 31. In addition, the first mirror is inclined at an angle of 45° with respect to the axial direction and a first radial direction, which will be described below. The first mirror 61 is a half mirror the transmissivity and reflectivity of which are substantially equal.

The first horizontal cylindrical portion 812 is a cylindrical member arranged to extend radially outward (i.e., in the first radial direction D1) from a vicinity of the lower end portion of the first vertical cylindrical portion 811. A cavity 815 inside of the first horizontal cylindrical portion 812 is joined to the cavity 814 radially inside of the first vertical cylindrical portion 811 at right angles. The cavity 815 inside of the first horizontal cylindrical portion 812 and the first mirror 61 are arranged to overlap with each other when viewed in the first radial direction D1.

The first lens 813 is arranged to cover a radially outer end portion of the first horizontal cylindrical portion 812.

The incident light 60 emitted from the light source 6 enters from above the first vertical cylindrical portion 811, and travels downward along the central axis 9 in the cavity 814 radially inside of the first vertical cylindrical portion 811. Then, a portion of the incident light 60 is reflected by the first mirror 61, and another portion of the incident light 60 passes through the first mirror 61 and travels further downward. A first reflected light 63, which is the portion of the incident light 60 reflected by the first mirror 61, travels in the first radial direction D1 in the cavity 815 inside of the first horizontal cylindrical portion 812, and exits the rotary drive apparatus 1 through the first lens 813.

An upper surface 820 of the second rotating body 82 is fixed to a lower surface of the second inertia portion 362 and the second rotor hub portion 332 through, for example, engagement, an adhesive, or the like. The second rotating body includes a second vertical cylindrical portion 821, the second mirror 62, a second horizontal cylindrical portion 822, and a second lens (not shown).

The second vertical cylindrical portion 821 is a cylindrical portion arranged to be substantially coaxial with the central axis 9 of the motor 10, and extend in the axial direction. An upper end portion of the second vertical cylindrical portion 821 and a lower end portion of the shaft through hole 310 are arranged axially opposite to each other. That is, a cavity 824 radially inside of the second vertical cylindrical portion 821 is axially continuous with the shaft through hole 310. The cavity 824 radially inside of the second vertical cylindrical portion 821 defines an optical waveguide.

At least a portion of the second mirror 62 is arranged on the central axis 9 below the bearing portion 23. In the present preferred embodiment, the second mirror 62 is fixed to a resin member of the second rotating body 82 between the upper end portion of the second vertical cylindrical portion 821 and the lower end portion of the shaft 31. In addition, the second mirror 62 is inclined at an angle of 45° with respect to the axial direction and a second radial direction, which will be described below. A fully reflective mirror is used as the second mirror 62.

The second horizontal cylindrical portion 822 is a cylindrical member arranged to extend radially outward (i.e., in the second radial direction D2) from a vicinity of the upper end portion of the second vertical cylindrical portion 821. A cavity 825 inside of the second horizontal cylindrical portion 822 is joined to the cavity 824 radially inside of the second vertical cylindrical portion 821 at right angles. The cavity 825 inside of the second horizontal cylindrical portion 822 and the second mirror 62 are arranged to overlap with each other when viewed in the second radial direction D2.

The second lens (not shown) is arranged to cover a radially outer end portion of the second horizontal cylindrical portion 822.

As described above, the other portion of the incident light 60 which passes through the first mirror 61 further travels downward. Then, this portion passes through the shaft through hole 310, and is reflected by the second mirror 62. A second reflected light 64, which is the portion of the incident light 60 reflected by the second mirror 62, travels in the second radial direction D2 in the cavity 825 inside of the second horizontal cylindrical portion 822, and exits the rotary drive apparatus 1 through the second lens (not shown).

Each of the first mirror 61 of the first rotating body 81 and the second mirror 62 of the second rotating body 82 is arranged to reflect the incident light 60 from the light source and emit the reflected light to the outside while rotating about the central axis 9 together with the rotating portion 3 of the motor 10. A portion of the incident light 60 passes through the shaft through hole 310, and this enables the incident light, which travels in one direction from the single light source 6 before the entry, to be reflected in the upper and lower rotating bodies 80 and the resulting reflected lights to be emitted to the outside while rotating. As a result, a wide range can be efficiently irradiated with light. Moreover, a wide range can be irradiated with light using the one light source 6 and the one motor 10, and the rotary drive apparatus 1 can be used even when a space in which the rotary drive apparatus 1 is to be installed is limited.

The first radial direction D1, in which the first reflected light 63 reflected by the first mirror 61 of the first rotating body 81 is emitted to the outside, and the second radial direction D2, in which the second reflected light 64 reflected by the second mirror 62 of the second rotating body 82 is emitted to the outside, are different from each other. As a result, the first and second reflected lights 63 and 64, which are emitted in the two different directions, take different times to reach an object to be irradiated with light while the motor 10 is rotating, and this makes it possible to recognize the three-dimensional position of the object in a space.

An outer circumferential surface 816 of the first rotating body 81 is arranged to have a reflectivity lower than that of a surface of the first mirror 61, and an outer circumferential surface 826 of the second rotating body 82 is arranged to have a reflectivity lower than that of a surface of the second mirror 62. This contributes to preventing diffuse reflection of the incident light 60 from the light source 6.

In the present preferred embodiment, the first and second rotating bodies 81 and 82 are arranged to have the same shape and size. As a result, each of the first and second rotating bodies 81 and 82, each of which is made of the resin, can be molded using one mold, excluding the first and second mirrors 61 and 62, which leads to a cost reduction. Note that the first and second rotating bodies 81 and 82 may alternatively be arranged to have different sizes and/or shapes. For example, the second vertical cylindrical portion 821 of the second rotating body 82 may not include the cavity 824 radially inside thereof.

2. Modifications

While preferred embodiments of the present invention have been described above, it will be understood that the present invention is not limited to the above-described preferred embodiments.

Figure 5:
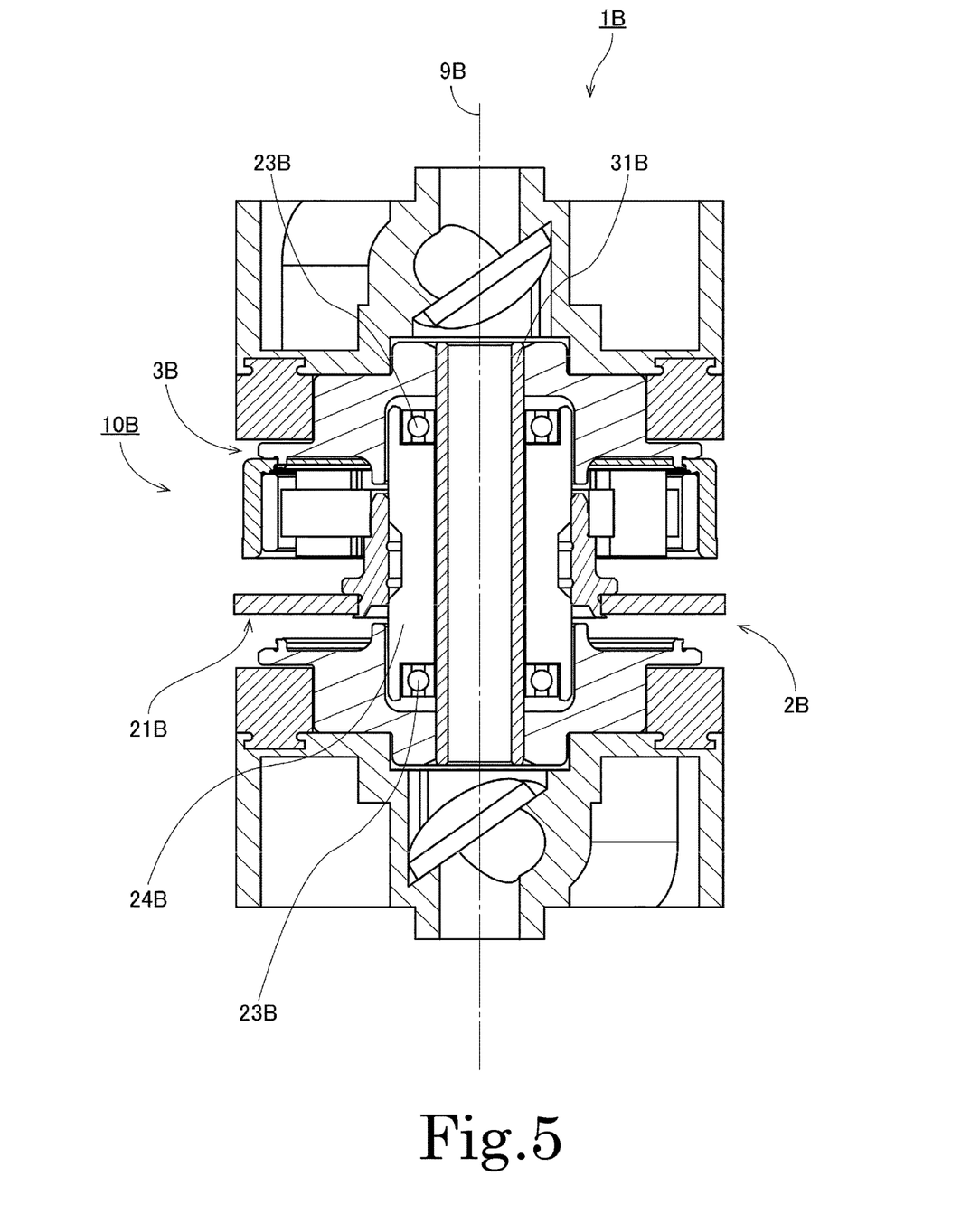
FIG. 5 is a vertical sectional view of a rotary drive apparatus according to a modification of the first preferred embodiment of the present invention.

FIG. 5 is a vertical sectional view of a rotary drive apparatus 1B according to a modification of the first preferred embodiment. In the modification illustrated in FIG. 5, rolling-element bearings are arranged between an inner circumferential surface of a sleeve 24B and an outer circumferential surface of a shaft 31B axially above and below a base portion 21B. A rotating portion 3B of a motor 10B is supported through a bearing portion 23B, which is defined by the rolling-element bearings, to be rotatable about a central axis 9B with respect to a stationary portion 2B.

Note that a bearing having another structure, such as, for example, a plain bearing, may alternatively be arranged between the stationary portion and the rotating portion.

The motor 10 used in the rotary drive apparatus 1 according to the first preferred embodiment is a so-called outer-rotor motor, in which the magnet 35 is arranged radially outward of the stator 22. Note, however, that a so-called inner-rotor motor, in which a magnet is arranged radially inward of a stator, may alternatively be used in a rotary drive apparatus according to another preferred embodiment of the present invention.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to rotate a first mirror and a second mirror each of which reflects incident light coming from a light source, the rotary drive apparatus comprising:
    rotating bodies including a first rotating body including the first mirror, and a second rotating body including the second mirror; and
    a motor arranged to support the rotating bodies; wherein the motor includes:
        a stationary portion including a stator; and
        a rotating portion supported through a bearing portion to be rotatable about a central axis extending in a vertical direction with respect to the stationary portion, the rotating portion including a magnet arranged opposite to the stator;
    the stationary portion includes a base portion arranged to support the stator;
    the rotating portion includes:
        a shaft arranged to extend along the central axis, and including a through hole passing therethrough in the vertical direction; and
        a rotor hub portion having the magnet directly or indirectly fixed thereto, and arranged to extend in an annular shape around the shaft;
    at least a portion of the first mirror is arranged on the central axis above the bearing portion; and
    at least a portion of the second mirror is arranged on the central axis below the bearing portion.

2. The rotary drive apparatus according to claim 1, wherein
    the incident light travels downward along the central axis from above the first mirror; and
    the first mirror is arranged to reflect a portion of the incident light, and the second mirror is arranged to reflect another portion of the incident light passing through the through hole.

3. The rotary drive apparatus according to claim 1, wherein
the first rotating body is arranged to emit a first reflected light reflected by the first mirror in a first radial direction; and
the second rotating body is arranged to emit a second reflected light reflected by the second mirror in a second radial direction different from the first radial direction.

4. The rotary drive apparatus according to claim 1, wherein the bearing portion includes:
a first bearing portion arranged above the base portion; and
a second bearing portion arranged below the base portion.

5. The rotary drive apparatus according to claim 4, wherein the stationary portion is arranged to radially overlap with at least a portion of the first bearing portion.

6. The rotary drive apparatus according to claim 4, wherein the stationary portion is arranged to radially overlap with at least a portion of the second bearing portion.

7. The rotary drive apparatus according to claim 1, wherein in the bearing portion, the stationary portion and the rotating portion are arranged opposite to each other with a gap therebetween, the gap having a lubricating oil arranged therein, and the bearing portion is arranged to induce a fluid dynamic pressure in the lubricating oil.

8. The rotary drive apparatus according to claim 7, wherein at least one surface of the lubricating oil is arranged to radially overlap with the rotor hub portion.

9. The rotary drive apparatus according to claim 7, wherein the lubricating oil is arranged to exist continuously in the gap.

10. The rotary drive apparatus according to claim 7, wherein the lubricating oil is arranged to exist at two or more separate locations in the gap.

11. The rotary drive apparatus according to claim 1, wherein
the bearing portion includes a radial bearing portion where an outer circumferential surface of the shaft and at least a portion of the stationary portion are arranged radially opposite to each other with a radial gap therebetween, the radial gap having a lubricating oil arranged therein; and
the radial bearing portion is arranged to radially overlap with a center of gravity of the rotating bodies.

12. The rotary drive apparatus according to claim 1, wherein the magnet is arranged radially outward of the stator.

13. The rotary drive apparatus according to claim 1, wherein the magnet is arranged radially inward of the stator.

14. The rotary drive apparatus according to claim 1, wherein the bearing portion is defined by rolling-element bearings.

15. The rotary drive apparatus according to claim 1, wherein
an outer circumferential surface of the first rotating body is arranged to have a reflectivity lower than that of a surface of the first mirror; and
an outer circumferential surface of the second rotating body is arranged to have a reflectivity lower than that of a surface of the second mirror.

* * * * *